Aug. 9, 1960  J. T. BERG ET AL  2,948,805
METHOD OF ENCLOSED WELDING
Filed Nov. 12, 1957

INVENTORS
JOZEF TER BERG
ANDRE LARIGALDIE
BY
Frank R. Trifari
AGENT

United States Patent Office 2,948,805
Patented Aug. 9, 1960

2,948,805

METHOD OF ENCLOSED WELDING

Jozef Ter Berg and Andre Larigaldie, Bobigny, France, assignors to North American Philips Company, Inc., New York, N.Y., a corporation of Delaware Filed Nov. 12, 1957, Ser. No. 695,852

Claims priority, application Netherlands Nov. 16, 1956

2 Claims. (Cl. 219—137)

Our invention relates to a method of enclosed welding members having similarly-shaped end surfaces, particularly railway rails positioned on a roadbed.

The term "enclosed welding" as used herein is to be understood to mean a method of welding iron workpieces by means of an electric arc, in which a substantially vertical seam between two workpieces is filled with welding metal and the seam, or part of it, is enclosed by means of auxiliary pieces to form a welding space which is open at the top and in which an electric arc is struck between one end of a coated welding electrode and the bottom of the space. The auxiliary piece is so arranged as to form a substantially vertical gap between a part of the workpiece and an auxiliary piece, which gap is sufficiently narrow to permit fluid slag to flow away, whereas fluid welding metal is not permitted to flow out of the enclosed space. In spite of continuous slag-formation due to melting of the electrode coating, the welding metal is thus prevented from being covered with a thick layer of slag, on which the electric arc is unable to act, which permits considerable quantities of welding metal to be deposited successively in a narrow space. Such welding is described for example in U.S. Patent 2,824,952.

Enclosed welding requires a high degree of accuracy in handling the electrode, since the electric arc has to be moved regularly across the bottom surface of the space in order to maintain the slag and the welding metal in the molten state over all of this bottom surface and to heat the parts of the workpiece.

In accordance with our invention the above-mentioned inconveniences are eliminated by using a coated electrode, the face of which on which the arc acts during the welding operation, is slightly smaller than and substantially similar to the cross-sectional area of the welding space, i.e. the space between the two members being welded in which the welding metal is deposited.

Consequently, an electrode in the form of a coated metal strip is employed for filling a vertical butt seam between two slabs, which strip fits with little clearance in the welding space. For butt-joining members having irregularly-shaped vertical cross sections, for example railway rails, use is made of an electrode in the form of a shaped coated strip, the outline of which substantially corresponds to that of the rail after it has been enlarged in a longitudinal direction of the electrode in approximately the same ratio as the cross-sectional area of the core of the electrode is smaller than the cross-sectional area of the welding space.

Although, in carrying out the method according to the invention the electrode cannot be given the customary lateral movement, or can be moved only a limited amount, this is not objectionable. We have found that even without lateral motion of the electrode end, the arc, which usually acts only at a part of the electrode end face, moves regularly along this end face and consequently covers the bottom surface of the welding space in a short time, so that this bottom surface is maintained evenly throughout at a high temperature and inclusions of solidified slag parts are prevented.

The handling of the electrode is consequently limited mainly to a vertical downward movement for maintaining the arc length constant. This has the advantage that the welding process is simple and may be carried out automatically by causing the feed rate of the electrode to be controlled by the arc voltage, which is known per se.

The method according to the invention has the additional advantage that the supporting end of the electrode and the coating adjacent thereto is less exposed to heat than when using a coated wire electrode having a diameter corresponding to or slightly smaller than the width of the welding space.

As is known, such heating imposes a limit on the strength of the usable welding current and the practicable length of the electrode. Hence, in the method according to the invention it is possible to use higher welding current and/or longer electrode than is customary when using electrodes made up of coated core wires of the same thickness. This is advantageous, since a greater melting rate of the electrode is reached and less interruptions of the welding operation are necessary for replacing a used up electrode by a fresh one. Usually, a single electrode provides a sufficient quantity of welding metal for filling a seam.

The electrode employed in our method comprises a core in the form of a metal strip which may be of regular or irregular shape, and which is provided with a slag and/or gas developing coating. The coating is of the non-conductive type in order to prevent short-circuits upon fortuitous contact with the workpiece. The electrode has a bare end for handling it and for supplying the welding current. The dimensions of the electrode are so chosen that, if the electrode is held at the middle of the seam or welding space, a clearance of not more than 2 to 3 millimetres is invariably maintained at both sides of the electrode. In the case of more clearance there is a likelihood of the bottom surface being no longer heated to a sufficient degree.

The metal strip will be not more than 10 millimetres thick, usually between 1 to 6 millimetres. The coating layer may be thin, since, as compared with other welding methods, only a small surface area is protected by it. Coatings 0.3 to 0.5 mm. thick have been found suitable.

In order that the inventon may be readily carried into effect, an example will now be described in detail with reference to the accompanying drawing, in which Fig. 1 is a side view of an arrangement of two plates arranged to be welded by the method of the invention and showing the electrode.

Figure 1:
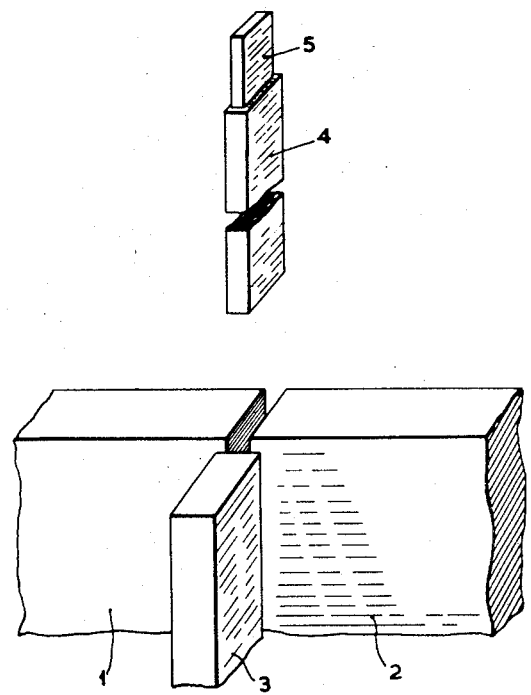

In Fig. 1, the reference numerals 1 and 2 designate shipping plates having a thickness of 12 millimetres and arranged with their end surfaces spaced apart about 6 millimetres. The reference numeral 3 denotes an auxiliary piece so arranged that it slightly overlaps the ends of plates 1 and 2. Auxiliary piece 3 is spaced about 1 to 2 millimetres from the surfaces of plates 1 and 2 to form two gaps through which the slag is permitted to escape during the welding. A second auxiliary piece similar to piece 3 (not shown) is located on the other side of the plates 1 and 2.

Electrode 4 comprises a core in the form of an iron strip having a length of about 530 millimetres, a thickness of about 2.5 millimetres and a width of about 10 millimetres. The electrode is provided with a non-conductive slag-forming coating 5 having a thickness of about 0.5 mm.; the coating being omitted from the upper end of the core to provide for holding the electrode in a suitable holder. Thus, the electrode will fit into the welding space with a clearance on each side of slightly more than 1 millimetre. During the welding the electrode 4 is moved vertically downward into the welding space formed between the end surfaces of plates 1 and 2 and the inner surfaces of auxiliary pieces 3 while the welding current of about 350 amps. is used.

Figure 2:
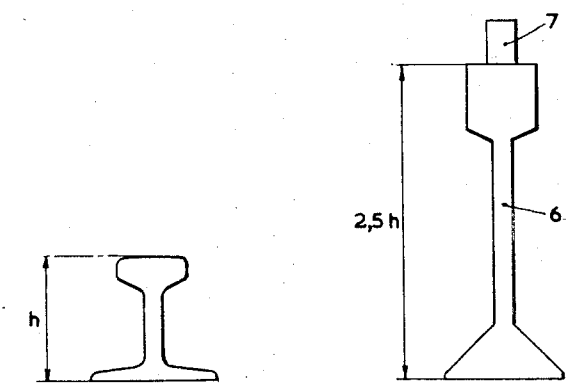
Fig. 2 is a cross-sectional view of a railway rail.
Figure 3:
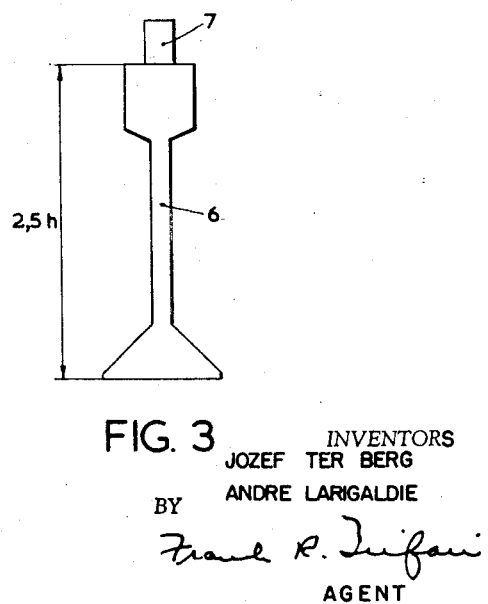
Fig. 3 is a side view of an electrode for butt-welding the railway rails shown in Fig. 2.

The electrode shown in Fig. 3 which is used for enclosed welding of railway rails shaped as shown in Fig. 2 is similar to electrode 4 but of different shape and comprises coated portion 6 and a bare portion 7. The core is 4 millimetres thick and the spacing of the rail ends to be joined by means of this electrode is 10 millimetres. The coating is 1.0 mm. thick, thus giving a clearance of about 2 millimetres. As shown in Figures 2 and 3 the length of the electrode shown in Fig. 3 is about 2½ times the height ($h$) of the railway rail to be welded shown in Figure 2.

The non-conductive slag-forming coatings of both electrode 4 and the electrode of Figure 3 consist mainly of a mixture of fluorspar $CaF_2$ and calc-spar $CaCo_3$ to which ferromanganese, ferro-silicon had been added, whereas sodium silicate served as a binder.

What is claimed is:

1. A method of enclosed welding two members with similarly-shaped end surfaces; comprising arranging the members with the end surfaces spaced apart to form a welding space; inserting into the welding space an elongated welding electrode having a core and a non-conductive slag-forming coating, a thickness slightly less than the corresponding width of said welding space and a longitudinal cross section which is an enlargement in only the length direction of the end surface of the members, the enlargements being approximately the same as the ratio of a cross-sectional area of the welding space to the corresponding cross-section of the core; carrying out the welding while moving the electrode into the welding space, and at least partly enclosing the sides and bottom of the welding space during the welding.

2. A method of enclosed welding two railway rails arranged on a roadbed with their end surfaces spaced apart to form a welding space; inserting into the welding space an elongated welding electrode having a core and a non-conductive slag-forming coating, a thickness not more than several millimetres less than the corresponding width of said welding space and a longitudinal cross section which is an enlargement in only the length direction of the end surface of the rails, the enlargements being approximately the same as the raito of a cross-sectional area of the welding space to the corresponding cross section of the core; carrying out the welding while moving the electrode into the welding space and at least partly enclosing the sides and bottom of the welding space during the welding.

References Cited in the file of this patent
UNITED STATES PATENTS

| | | |
|---|---|---|
| 483,425 | Coffin | Sept. 27, 1892 |
| 2,525,657 | Diller | Oct. 10, 1950 |